Figure 1:
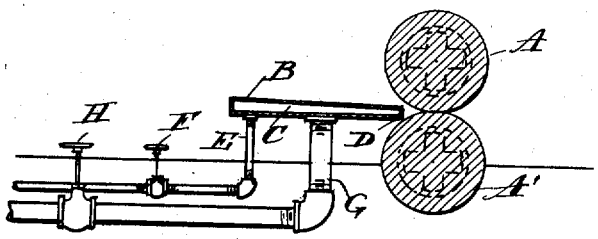

J. G. MAXWELL.

MEANS FOR REGULATING THE TEMPERATURE OF ROLLS.

APPLICATION FILED MAY 2, 1921.

Reissued Nov. 15, 1921. 15,227.

Inventor
James G. Maxwell
by Wm. H. Maxwell
Attorney

UNITED STATES PATENT OFFICE.

JAMES G. MAXWELL, OF CLEVELAND, OHIO.

MEANS FOR REGULATING THE TEMPERATURE OF ROLLS.

15,227. Specification of Reissued Letters Patent. Reissued Nov. 15, 1921.

Original No. 1,366,581, dated January 25, 1921, Serial No. 368,550, filed March 25, 1920. Application for reissue filed May 2, 1921. Serial No. 466,208.

*To all whom it may concern:*

Be it known that I, JAMES G. MAXWELL, a citizen of the United States, and resident of Cleveland, in the county of Cuyahoga and State of Ohio, have invented certain new and useful Improvements in means for Regulating the Temperature of Rolls, of which I hereby declare the following to be a full, clear, and exact description, such as will enable others skilled in the art to which it appertains to make and use the same.

The objects of the invention are to provide means for maintaining the temperature of a pair of rolls at an approximately uniform degree throughout the entire time that the rolls are in operation, which may be prolonged for an entire week.

The rolls in a sheet metal rolling or jobbing mill are sometimes too cold when the metal bars which leave the furnace in a heated condition are passed through them, and the difference in the temperature of the rolls and bar is often so great at the initial stage of rolling the metal that there is a danger of cracking the rolls on account of the too sudden and unequal expansion thereof when the hot bars pass between them, also after continual use the rolls become so heated on their surfaces that they will pick up the scale that leaves the bars and will acquire a rough surface thereby, and will impress their roughened surfaces upon the finished sheets.

To overcome these tendencies and conditions, the temperature of the rolls is maintained substantially uniform during their operation by means, first, of the application of hot steam to the rolls at or near their adjacent surfaces or centers of contact, which raises their temperature sufficiently to prepare them for receiving the passes of hot metal without injury to the rolls, and second, by means of the application of a combined air and steam blast until the rolls become heated enough to expand in the middle more than at their extremities, when an air blast alone is applied to prevent further expansion of the rolls. And the blast of steam and air, or air, is controlled in such a manner as to prevent any change in the shape of the rolls while they are in use, by means of a suitable supply pipe or pipes, for steam or air, and valves to regulate the passage therethrough.

The invention includes a hollow fore plate, or manifold, having an outlet opening or openings in the transverse edge adjacent to the rolls, and this opening is preferably larger at the center of the rolls, to discharge more steam and air, or air or steam alone, upon the contacting surfaces of the rolls, where the amount of expansion of the rolls is greatest, and the opening is gradually reduced from the center of the fore plate in the direction of its extremities, and the outer edges of the fore plate.

Through this opening the steam and air under pressure are uniformly distributed over both rolls, thus uniformly heating or cooling them according to the effects desired.

By thus maintaining a low and uniform temperature throughout the rolls the sheets are more smoothly finished and the amount of roll breakage is considerably reduced.

The invention is hereinafter more fully described, illustrated in the accompanying drawings and specifically pointed out in the claims.

Figure 2:
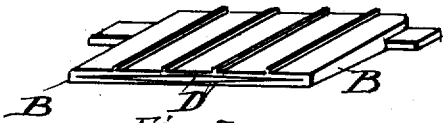
Figure 3:
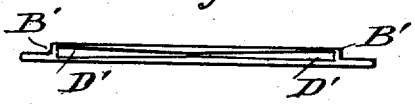

In the accompanying drawings, Figure 1 is a transverse section of a pair of rolls and a hollow fore plate, showing the mode of application of steam and air blasts, alternately or simultaneously, thereto; Fig. 2, is a perspective of the fore plate, showing the opening in the front edge thereof. Fig. 3 is an elevation of the inner edge of a modified form of fore plate.

In these views, A, and A′ are upper and lower rolls of a pair of rolls, adapted for rolling tin or other metal sheets. B is the fore plate which is provided with the internal cavity or chamber C, having an outlet, or outlet openings, D, D, in its front edge.

This opening is largest at the center of this edge and is preferably reduced gradually at the side edges of the plate, but may be largest at its extremities, and extends substantially the entire width of the aforesaid front edge as shown in Fig. 3, at $B^1$, $D^1$. At E is shown a supply pipe for steam, leading to the chamber, C, which is controlled by means of the valve, F. At G is shown a supply pipe for air, leading to the chamber, C, which is controlled by means of the valve, H.

These valves can be separately opened and closed, so that either steam or air, or a predetermined blast of commingled steam and air, can be employed, the use of which is determined by the temperature and conditions of the rolls.

By proper manipulation of the blasts of steam or air, the rolls can be maintained at a normal degree of temperature and their shape can be maintained without change during the entire use of the rolls, however prolonged it may be.

By utilization this process it is possible to immediately roll metal sheets of the full width, for which the rolls were designed.

The present practice necessitates first rolling narrower sheets than are desired and then gradually bringing the rolls to proper shape by expansion after repeated use, to receive the full width of sheets for which the rolls were originally designed.

Having lescribed the invention, what I claim as new and desire to secure by Letters Patent is:

1. In an appliance for maintaining a uniform degree of temperature in a pair of rolls, the combination with said rolls, of independently controlled supply pipes for steam and air respectively, and a common chamber into which said pipes discharge, said chamber provided with an elongated discharge opening adjacent to the contacting surfaces, of said rolls.

2. In an appliance for maintaining a uniform degree of temperature in a pair of rolls, the combination with said rolls of independently controlled supply pipes for steam and air respectively, and a common chamber into which said pipes discharge, said chamber provided with an elongated discharge opening adjacent to the contacting surfaces of said rolls, said elongated discharge opening being largest at the center and gradually reduced toward its extremities, for the purpose described.

3. The combination with a pair of rolls, of a hollow fore plate therefor, the cavity in said fore plate having an opening extending through the front edge of said plate, adjacent to the contacting surfaces of said rolls, and means for independently introducing steam and air under pressure into said cavity in said fore plate.

4. The combination with a pair of rolls, of a hollow fore plate therefor, the cavity in said fore plate having an opening extending through the front edge of said plate, adjacent to the contacting surfaces of said rolls, and means for independently introducing steam and air under pressure into said cavity in said fore plate, and separate means for controlling the passage of steam and air to said cavity.

5. In a device for the purpose set forth, the combination with a pair of rolls, of a fore plate provided with a chamber adapted to receive and transmit a temperature regulating agency, said chamber provided with an outlet opening in its edge, adjacent to the contacting surfaces of said rolls.

6. In a device for the purpose set forth, the combination with a pair of rolls, of a hollow fore plate adapted to receive and transmit a temperature regulating agency, said fore plate provided with an opening in its edge adjacent to the contacting surfaces of said rolls, and means for introducing into said fore plate said temperature regulating agency.

7. In a device for the purpose set forth, the combination with a pair of rolls, of a hollow fore plate, and means for introducing a temperature regulating agency into said fore plate, said fore plate provided with a discharge opening adapted to distribute the aforesaid temperature regulating agency over the surface of said rolls.

8. In a temperature regulating device, said device adapted to preserve the same degree of temperature throughout the entire working surface of the rolls, the combination with a pair of rolls, of a hollow fore plate therefor, and means for transmitting a temperature controlling agency through said hollow fore plate to said rolls.

Signed at Cleveland, Ohio, April 20, 1921.

JAMES G. MAXWELL.

In presence of—
Wm. M. Monroe,
Chas. F. Sipe.